United States Patent
Wang et al.

(10) Patent No.: US 8,913,871 B2
(45) Date of Patent: Dec. 16, 2014

(54) ELECTRONIC DEVICE AND PLAYING METHOD THEREOF

(71) Applicants: Hong Fu Jin Precision Industry (ShenZhen) Co., Ltd., Shenzhen (CN); Hon Hai Precision Industry Co., Ltd., New Taipei (TW)

(72) Inventors: Ya-Guo Wang, Shenzhen (CN); Chun-Ching Chen, New Taipei (TW)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 0 days.

(21) Appl. No.: 13/866,005

(22) Filed: Apr. 18, 2013

(65) Prior Publication Data

US 2014/0064708 A1    Mar. 6, 2014

(30) Foreign Application Priority Data

Aug. 31, 2012   (CN) .......................... 2012 1 0317705

(51) Int. Cl.
*G11B 19/02*        (2006.01)
*H04N 9/87*         (2006.01)

(52) U.S. Cl.
CPC ...................................... *H04N 9/87* (2013.01)
USPC ........................................................ 386/241

(58) Field of Classification Search
CPC ......... G11B 27/36; G11B 19/02; G11B 20/10
USPC ........................................................ 386/241
See application file for complete search history.

(56) References Cited

U.S. PATENT DOCUMENTS 7,016,268 B2 *   3/2006   Yoshida et al. ............ 369/30.24
7,301,857 B2 *   11/2007  Shah et al. ................. 369/30.24
2002/0126993 A1 * 9/2002  Sakuramoto et al. ........... 386/77

* cited by examiner

*Primary Examiner* — Huy T Nguyen
(74) *Attorney, Agent, or Firm* — Novak Druce Connolly Bove + Quigg LLP

(57) ABSTRACT

A playing method is executed in an electronic device. The electronic device plays information from a storage unit. The electronic device includes a non-volatile memory. The playing method includes steps of: receiving a first playing commands; obtaining information from the storage unit in response to the first playing commands; playing the obtained information; obtaining a playing position at a predetermined time interval; and storing the playing position into the non-volatile memory.

13 Claims, 2 Drawing Sheets

ELECTRONIC DEVICE AND PLAYING METHOD THEREOF

BACKGROUND

1. Technical Field

The present disclosure relates to electronic devices, particular to a playing method of an electronic device.

2. Description of Related Art

An electronic device, such as a disc player is capable of playing a disc. When the disc player abnormally turns off while the disc player is playing a disc, the disc player may play the disc from a start position, and not from the position where the disc player stopped playing when the disc player is restarted. As a result, a user will view or listen to repeated contents, and it is inconvenient for the user.

Therefore, there is room for improvement within the art.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the present embodiments. Moreover, in the drawings, like reference numerals designate corresponding parts throughout the several views.

DETAILED DESCRIPTION

Figure 1:
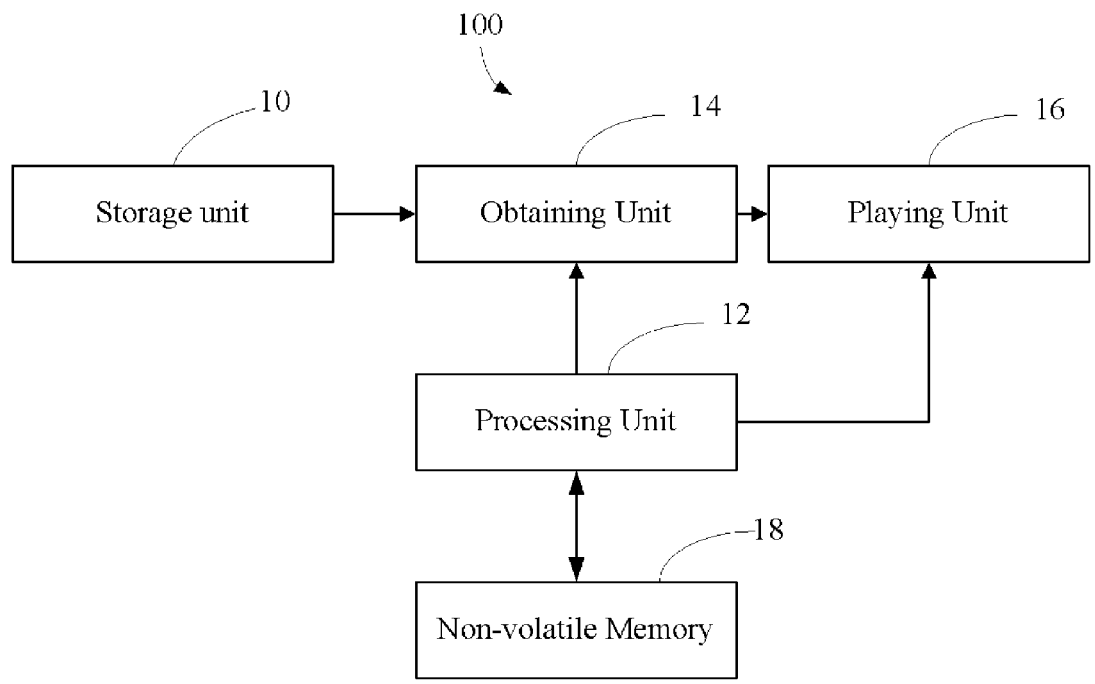
FIG. 1 is a function block of a disc player in accordance with an embodiment.

FIG. 1 shows an embodiment of an electronic device 100. The electronic device includes a storage unit 10, a processing unit 12, an obtaining unit 14, a playing unit 16, and a non-volatile memory 18. In the embodiment, the electronic device 100 is a disc player; the non-volatile memory 18 is an electrically-erasable programmable read-only memory (EEPROM); the storage unit 10 is a disc; the obtaining unit 14 is an optical pick-up unit.

The storage unit 10 stores a plurality of information. In the embodiment, the storage unit 10 stores audio data or video data. The storage unit 10 includes a start position and an end position. The processing unit 12 receives a first playing command inputted by a user, and controls the obtaining unit 14 to obtain information from the storage unit 10 at the start position in response to the first playing command. The processing unit 12 further controls the playing unit 16 to play the obtained information. The processing unit 12 further obtains playing position at a predetermined time interval while the playing unit 16 is playing the information. The playing position indicates that the information being played is placed at which position of the storage unit 10. The processing unit 12 further stores the obtained playing position into the non-volatile memory 18. As a result, when either the electronic device 100 suddenly turns off abnormally in the case of the electronic device 100 malfunctioning or the electronic device 100 turns off normally in the case that the user turns off the electronic device 100, the playing position of the storage unit 10 from where the electronic device 100 has played for a time period no longer than the predetermined time interval before the electronic device 100 turns off, and is recorded into the non-volatile memory 18.

The processing unit 12 receives a second playing command by the user after the electronic device 100 turns off, and controls the obtaining unit 14 to read the information from the position which is in accordance with the playing position which is lastly stored in the non-volatile memory 18 in response to the second playing command As a result, the electronic device 100 does not need to play from the start position of the storage unit 10 when the electronic device 100 turns off abnormally. Therefore, the user can continue to view or listen to the contents from the position last played.

Figure 2:
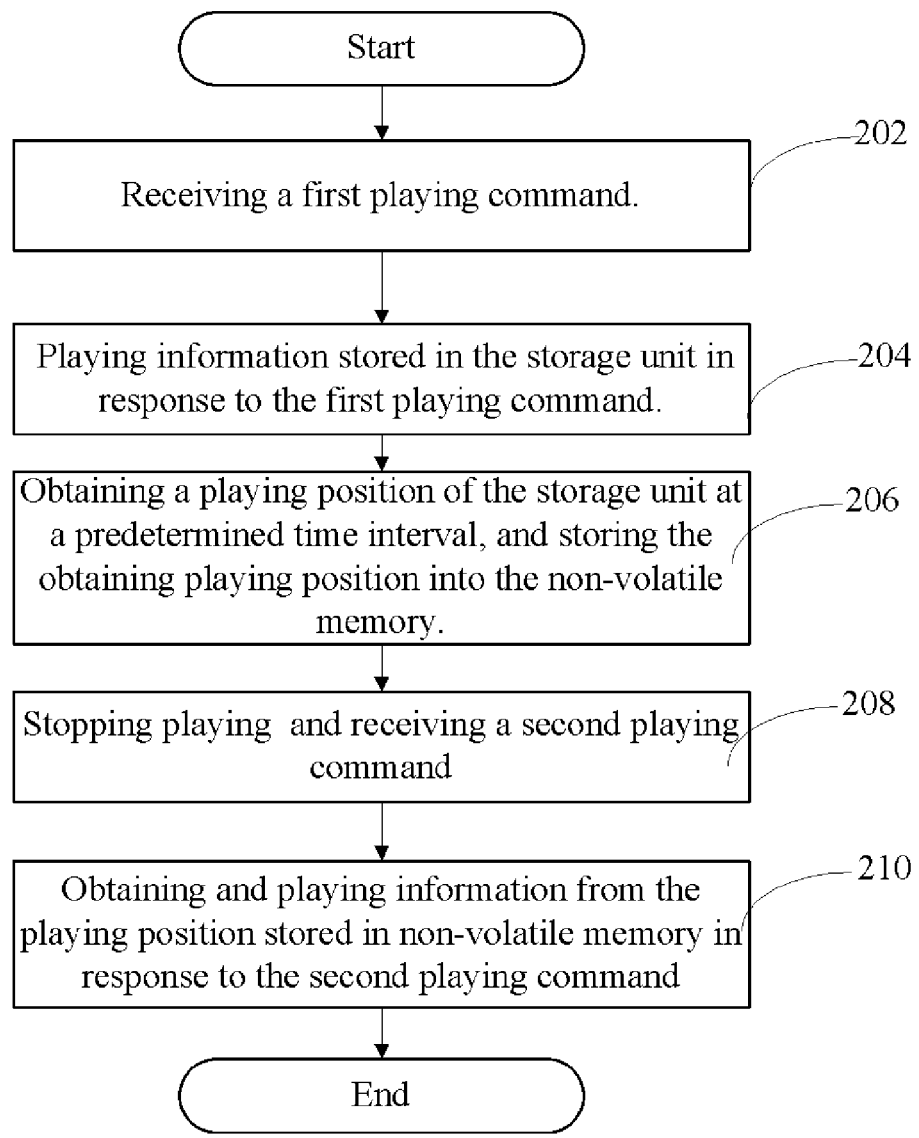
FIG. 2 is a playing method of a disc player in accordance with an embodiment.

FIG. 2 shows an embodiment of a playing method. The playing method is applied to an electronic device. The electronic device plays information stored in a storage unit. The electronic device includes a non-volatile memory. The playing method includes following steps.

In step 202, receiving a first playing command inputted by a user.

In step 204, playing information stored in the storage unit in response to the first playing command.

In step 206, obtaining a playing position of the storage unit at a predetermined time interval, and storing the obtaining playing position into the non-volatile memory. The playing position indicates the information being played is placed at which position of the storage unit.

In step 208, stopping playing information and receiving a second playing command inputted by the user. For example, the electronic device turns off, the electronic stops playing the information. The second playing command is received after the electronic device restarts.

In step 210, obtaining and playing information from the playing position stored in non-volatile memory in response to the second playing command Even though relevant information and the advantages of the present embodiments have been set forth in the foregoing description, together with details of the functions of the present embodiments, the disclosure is illustrative only; and changes may be made in detail, especially in the matters of shape, size, and arrangement of parts within the principles of the present embodiments to the full extent indicated by the broad general meaning of the terms in which the appended claims are expressed.

What is claimed is:

1. An electronic device, comprising:
   an obtaining unit to obtain information stored in a storage unit in response to a first playing command inputted by a user;
   a playing unit to play the obtain information;
   a processing unit obtaining a playing position at a predetermined time interval, wherein the playing position from where the electronic device has played for a time period no longer than the predetermined time interval before the electronic device turns off; and
   a non-volatile memory to store the obtain playing position.

2. The electronic device of claim 1, wherein the playing position indicates that the information being played is placed at which position of the storage unit.

3. The electronic device of claim 1, wherein after the electronic device turns off and the electronic device restarts, the obtaining unit obtains information of the storage unit from the playing position lastly stored into the non-volatile memory in response to a second playing command inputted by the user, the playing unit plays the information from the playing position.

4. The electronic device of claim 1, wherein the non-volatile memory is an electrically-erasable programmable read-only memory (EEPROM).

5. The electronic device of claim 1, wherein the storage unit is a disc.

6. The electronic device of claim 1, wherein the obtaining unit comprises an optical pick up unit.

7. A playing method, executed in an electronic device, the electronic device capable of playing information from a storage unit, the electronic device comprising a non-volatile memory, the playing method comprising steps of:

receiving a first playing commands;

obtaining information from the storage unit in response to the first playing commands;

playing the obtained information;

obtaining a playing position at a predetermined time interval, wherein the playing position from where the electronic device has played for a time period no longer than the predetermined time interval before the electronic device turns off; and storing the playing position into the non-volatile memory.

8. The playing method of claim 7, wherein after storing the playing position into the non-volatile memory, the playing method further comprising steps:

stopping playing the information;

receiving a second playing commands inputted by the user; and obtaining information of the storage unit from the playing position lastly stored into the non-volatile memory in response to a second playing command; and playing the information from the playing position.

9. The playing method of claim 7, wherein after storing the playing position into the non-volatile memory, the playing method further comprising steps:

turning off the electronic device;

receiving a second playing commands when the electronic device restarts;

obtaining information of the storage unit from the playing position lastly stored into the non-volatile memory in response to a second playing command; and playing the information from the playing position.

10. The playing method of claim 7, wherein the non-volatile memory is an electrically-erasable programmable read-only memory (EEPROM).

11. The playing method of claim 7, wherein the storage unit is a disc.

12. The playing method of claim 7, wherein the electronic device comprises an optical pick up unit.

13. The playing method of claim 7, wherein the playing position indicates that the information being played is placed at which position of the storage unit.

\* \* \* \* \*